XR 3,636,261
TX 3044D
X 3045Y
X 3049W

United States Patent [15] 3,636,261
Preston, Jr. [45] Jan. 18, 1972

[54] METHOD AND APPARATUS FOR OPTICAL SPEECH CORRELATION

[72] Inventor: Kendall Preston, Jr., New Haven, Conn.
[73] Assignee: The Perkin-Elmer Corporation, Norwalk, Conn.

[22] Filed: Apr. 25, 1969
[21] Appl. No.: 819,257

[52] U.S. Cl. .......... 179/1 SB, 350/3.5
[51] Int. Cl. .......... G10l 1/00
[58] Field of Search .......... 179/1 SB, 1 VS; 250/199

[56] References Cited

UNITED STATES PATENTS

| | | | |
|---|---|---|---|
| 2,646,465 | 7/1953 | Davis et al. | 179/1 SB |
| 2,685,615 | 8/1954 | Biddulph et al. | 179/1 SB |
| 3,280,257 | 10/1966 | Orthuber et al. | 179/1 SB |
| 3,482,101 | 12/1969 | Slaymaker | 250/199 |

*Primary Examiner*—Kathleen H. Claffy
*Assistant Examiner*—Horst F. Brauner
*Attorney*—Edward R. Hyde, Jr.

[57] ABSTRACT

A system for speech correlation which comprises a coherent light modulating system which accepts a two-dimensional array of information corresponding to a speech spectrogram and superimposes this information two dimensionally on the cross section of a coherent light beam. The correlator further comprises means for imaging the modulated beam on a series of comparison means which correspond to words stored in a library. Preferably, the means provided is capable of simultaneously producing multiple images of the input so as to enable simultaneous comparison. Finally, means are provided for indicating correlation between the input and one of the words in the library. The method embodiment of this invention preferably comprises the steps of modulating the two-dimensional cross section of a coherent beam with speech spectrogram information, the depth of the modulation corresponding to intensity in the spectrogram. The method also includes the steps of comparing the modulated beam with a set of masks corresponding to a predetermined vocabulary and producing an indication whenever correlation occurs between the input and one of the words in the vocabulary.

6 Claims, 2 Drawing Figures

Figure 1:
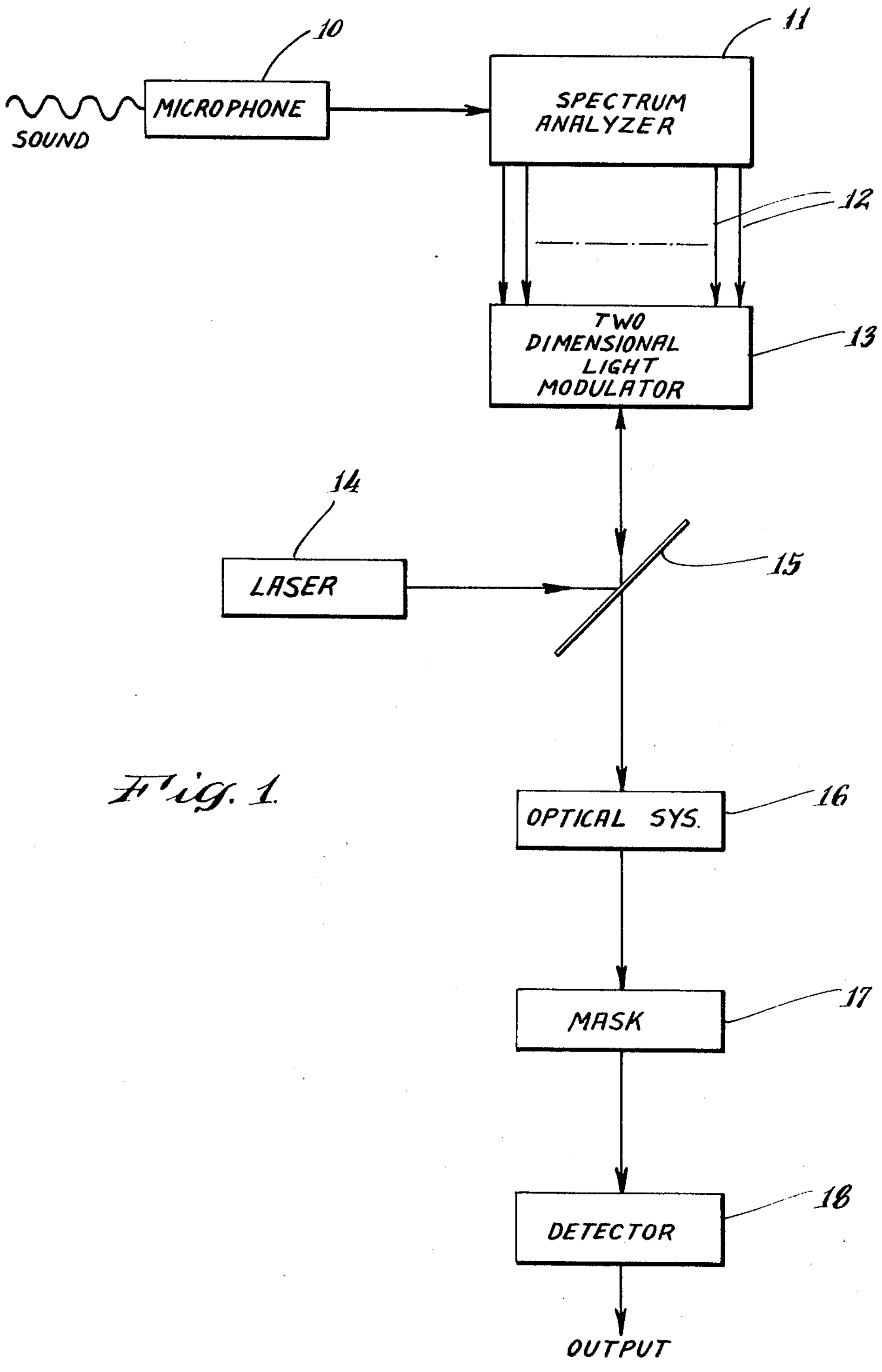

3636261
NO OR CLASSIF

PATENTED JAN 18 1972 3,636,261

SHEET 1 OF 2

INVENTOR.
Kendall Preston, Jr.
BY
E R Hyde Jr.
ATTORNEY.

INVENTOR.
*Kendall Preston, Jr.*
BY
E R Hyde Jr.
ATTORNEY.

METHOD AND APPARATUS FOR OPTICAL SPEECH CORRELATION

This invention relates to systems for automatic speech recognition and particularly relates to an improved method and apparatus for performing such recognition in real time. Previous methods of automatic speech recognition have generally been performed by electronic methods and, as a consequence, have been limited in speed and vocabulary by the fact that such processing must be done one dimensionally. Thus, for each instant of time, several electronic frequency analyses and correlations must be performed or, for the given interval of time involved, each frequency level must be successively analyzed and correlated. Furthermore, each such speech element must be compared serially with each item in the library of the machine, thus further delaying the production of a result. Since the electronic equipment required to perform such processing simultaneously would be prohibitively expensive, electronic speech recognition has not yet achieved the capability of instantaneous speech recognition.

Systems have also been proposed which utilize optical techniques to record a speech wave form on film and then to optically correlate the film record with a library of films stored in the machine. However, these systems have not become practical because of the delays involved in film processing and developing and also because of the inconvenience of storing chemicals and performing processing in the machine.

Accordingly, it is a primary object of the present invention to provide a novel method and apparatus by means of which real time speech correlation can be readily performed.

Another object of this invention is the provision of a new and improved method of speech recognition which provides increased speed and accuracy.

Another object of this invention is the provision of a new and improved apparatus for speech recognition which provides rapid correlation of an input with a large stored library.

It is also an object of this invention to provide a new and improved apparatus for speech correlation which is capable of storing and correlating large quantities of speech data.

Briefly, in accord with one embodiment of this invention, a system for speech correlation is provided which comprises a coherent light-modulating system which accepts a two-dimensional array of information corresponding to a speech spectrogram and superimposes this information two dimensionally on the cross section of a coherent light beam. The correlator further comprises means for imaging the modulated beam on a series of comparison means which correspond to words stored in a library. Preferably, the means provided is capable of simultaneously producing multiple images of the input so as to enable simultaneous comparison. Finally, means are provided for indicating correlation between the input and one of the words in the library.

The method embodiment of this invention preferably comprises the steps of modulating the two-dimensional cross section of a coherent beam with speech spectrogram information, the depth of the modulation corresponding to intensity in the spectrogram. The method also includes the steps of comparing the modulated beam with a set of masks corresponding to a predetermined vocabulary and producing an indication whenever correlation occurs between the input and one of the words in the vocabulary.

Further objects and advantages of this invention will become apparent as the description and illustration thereof proceed.

Figure 2:
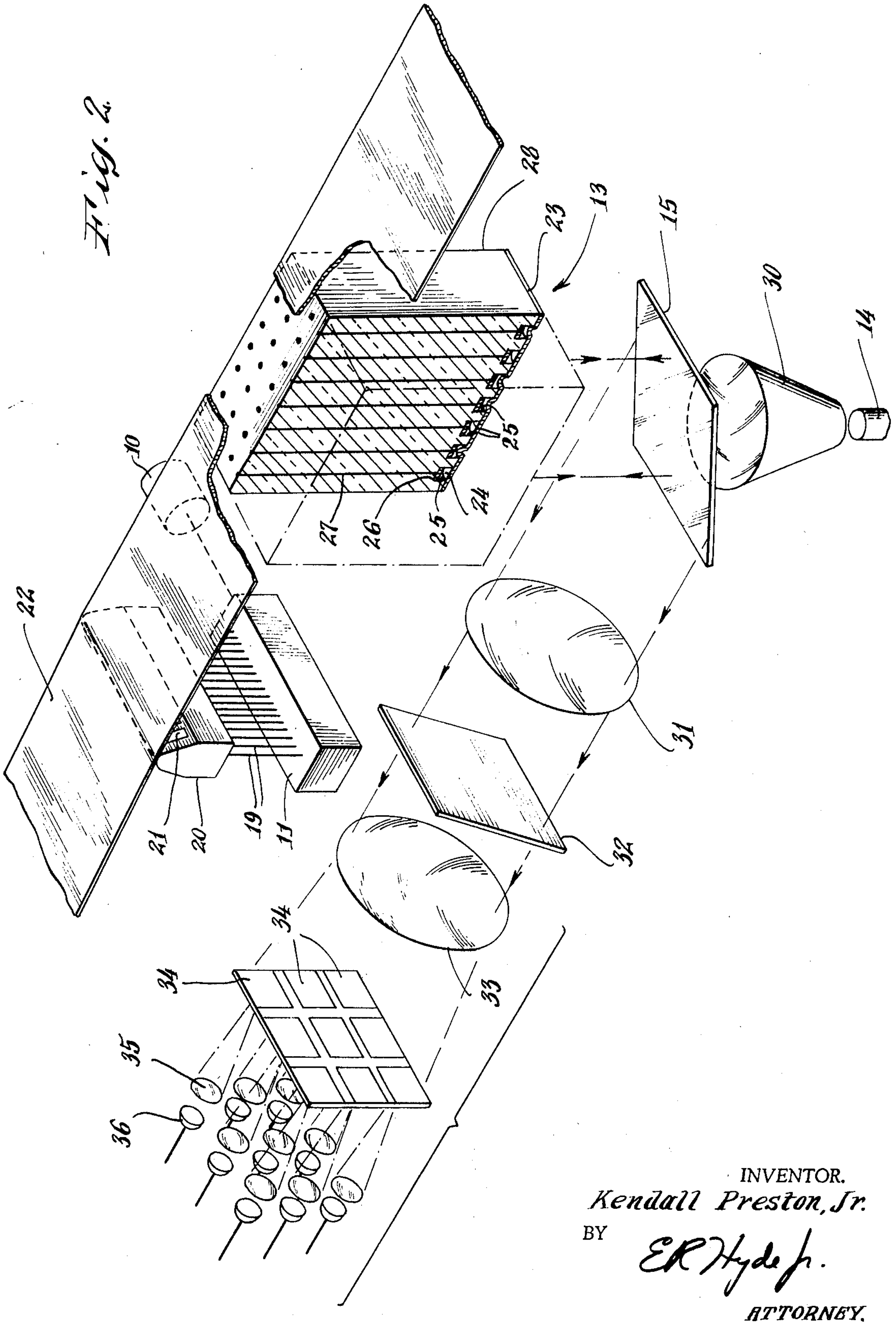

For a better understanding of this invention, reference is made to the following specification, taken in conjunction with the appended drawings, in which:

FIG. 1 is a simplified schematic diagram illustrating the basic elements of a system in accord with the present invention; and FIG. 2 is a schematic view of apparatus representing a preferred embodiment of the system of FIG. 1.

In FIG. 1, the basic elements of a system in accord with the present invention are illustrated. As shown, the sound of the speaker's voice is incident on a microphone 10 and the output thereof is applied to an electronic spectrum analyzer 11. The function of the analyzer device is to break down the spoken word into its various frequency components and to produce an output for each frequency which corresponds to the intensity at that frequency as a function of time. In practice, this is done by selecting a group of about 30 frequencies spaced over the normal audio range of the human voice and measuring the signal intensity at each of these frequencies. The connections 12 leading from the spectrum analyzer indicate the transmittal of these frequency functions by the spectrum analyzer.

The output of the spectrum analyzer is applied to a two-dimensional light modulator 13, the function of which is to superimpose on a beam of light from laser 14 and beam splitter 15, a record of the pattern received from the spectrum analyzer. In accord with the invention, the modulator preferably comprises means for controlling the phase or amplitude of the coherent light beam from the laser. Preferably, the $x$ and $y$ dimensional locations in the light beam correspond respectively to frequency and time, while the degree of modulation at each location corresponds to intensity.

The modulated beam from modulator 13 passes through the beam splitter 15 and an optical system 16 and then is directed to a mask 17 which corresponds to one or more known symbols or words. A large amplitude signal is produced from the region of the mask which matches the incoming beam. This output is sensed by one of a plurality of detectors 18 and an output signal is produced which is then transmitted to the utilization means.

In accord with the present invention, the method performed by the apparatus of FIG. 1 includes the steps of instantaneously modulating a beam of light with an accurate spectrogram of the spoken word, and immediately making a comparison of the modulated beam with a library of predetermined references. Thus, a real time comparison of a series of spoken words with a selected set of references can be made without delay and with increased accuracy.

A specific, preferred embodiment of the apparatus of this invention is shown in FIG. 2. The microphone 10 and spectrum analyzer 11 are shown schematically as in FIG. 1. The output from the analyzer, which comprises a set of signals, corresponds to the amplitude at each of a set of predetermined frequencies of the sound received by the microphone. This output is transmitted by connections 19 to an electrostatic recording element 20 which includes a corresponding plurality of recording heads 21. A strip of dielectric tape 22 receives the signals from the recording element and, since it is moving continuously, the tape carries a continuous record of a series of sounds.

The tape next passes adjacent the back surface of a light modulator system 13. This light modulator, in accord with the preferred embodiment of this invention, corresponds to the device described and claimed in U.S. Pats. No. 3,479,109 dated Nov. 18, 1969 and No. 3,463,572 dated Aug. 26, 1969. Preferably, this device comprises a reflective membrane 23 disposed over an array of wells 24 defined by walls 25. Each of the membrane elements is deflectable according to the amount of difference between the membrane 23 and electrodes 26 which are mounted at the bottom of each of the wells. Electrodes 26 receive a charge through wires 27 extending through a substrate 28 which contact the dielectric tape 22 upon which the speech spectrogram has been recorded. Thus, as the tape moves from the recording element 20 to the modulator 13, the frequency intensity spectrum of the real time recording of the sound present a moving spectrogram defined by the deflection of the membrane elements. At any moment, the spectrogram presented corresponds to the sounds received in a time interval determined by the number of rows of modulator elements. This is selected to be a convenient time interval; for example, in interrupting a simple set of words, a time interval of one second might be sufficient. Sufficient information for this interval of time could be presented by a modulator having 100 rows. The number of columns of deflectable elements in the modulator corresponds to the number of recording heads 21 and to the number of frequency channels in the spectrogram.

Laser 14, as previously noted, provides a coherent beam of radiation which is modulated by the pattern of deflective elements. The laser beam, after being expanded by a suitable lens system 30, passes through the beam splitter 15 and is incident and reflected from the membrane 23. Since the beam from the laser is coherent, the phase of the beam reflected from all undeflected elements is the same, while the phase of the beam reflected from deflected elements depends on the depth of the deflection. The modulated beam is reflected by beam splitter 15 into lens 31 which transmits it to a holographic light redistributor 32 which, in combination with lens 33, produces multiple images of the modulated beam. Specifically, the redistributor 32 corresponds to the device described and claimed in my copending application Ser. No. 667,433 filed Sept. 13, 1967, now abandoned. It comprises a positive image of a hologram of an array of points. Thus, optical system 16, which includes lens 31 and lens 33, and redistributor 32, produces a multiplicity of images of the beam corresponding to the array of points from which the redistributor was produced. For illustrative purposes, in FIG. 2 it has been assumed that this array of points was made up of a 3×3 array. Thus, nine images of the modulator surface are produced and applied to mask 17. This mask includes a library of spectrograms 34 of selected reference words, for example of the digits 1 through 9 as spoken by a given individual. Each spectrogram comprises a combination of opaque and transparent regions; the transparent regions being located at positions corresponding to the maximum intensity regions of the various word spectrograms.

A plurality of lenses 35 and light-sensitive detectors 36 are provided in arrays corresponding to the array of spectrograms 34. If the word spoken matches one of the spectrograms, the maximum amount of light is transmitted through that image and is focused by the corresponding lens onto a detector 36. The amplitude of the light focused on the corresponding detector is above threshold level and upon all other detectors, below threshold level. The output of the light detector is then used to control whatever utilization means may be provided.

It will be clear to those skilled in the art that many changes and modifications may be made from the specific system which has been described without departing from the underlying concept of this invention. The above description includes specific elements which perform the required functions, but many of these elements can be replaced by equivalent devices. The system may also be adapted to various applications, such as diagnosis of speech defects, speaker identification, acoustic signature analysis of nonhuman sounds, etc. Accordingly, it is intended that the appended claims cover all such changes and modifications as fall within the true scope of this invention.

What is claimed is:

1. An optical system for speech recognition comprising:
means for producing a beam of coherent radiation;
means for spatially modulating said beam according to information contained in a speech element;
means for comparing said beam with a plurality of recorded speech elements comprising a hologram of an array of points for producing a plurality of images of said modulated beam; and
means for producing an output indicative of a match between one of said images of said modulated beam and one of said plurality of recorded elements.

2. An optical system as claimed in claim 1 and including an array of masks, each corresponding to a specific speech element, said array corresponding spatially to said array of points.

3. An optical system as claimed in claim 2 wherein said output-producing means comprises a radiation-sensitive means which produces an output corresponding to the spatial location of incident radiation.

4. An optical system as claimed in claim 2 wherein said modulating means comprises means for superimposing on said beam information from said speech element corresponding to frequency, intensity and time.

5. An optical system as claimed in claim 4 wherein said output-producing means comprises means for responding to a match between an image of said modulated beam and one of said masks.

6. A method for optically analyzing sound comprising the steps of:
providing a beam of coherent radiation;
spatially modulating said beam according to information contained in a sound;
providing a hologram of an array of points;
directing the modulated beam through the hologram to produce a plurality of images of the modulated beam;
comparing said plurality of images respectively with a plurality of masks corresponding to selected sounds; and
producing an output indicative of a match between one of said images and one of said masks.

* * * * *